(12) United States Patent
Tang (10) Patent No.: US 9,983,461 B2
(45) Date of Patent: May 29, 2018

(54) GIMBAL LOCKING DEVICE AND GIMBAL ASSEMBLY USING SAME

(71) Applicant: SZ DJI OSMO TECHNOLOGY CO., LTD., Shenzhen (CN)

(72) Inventor: Yin Tang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 14 days.

(21) Appl. No.: 15/309,759

(22) PCT Filed: May 9, 2014

(86) PCT No.: PCT/CN2014/077200
§ 371 (c)(1),
(2) Date: Nov. 8, 2016

(87) PCT Pub. No.: WO2015/168952
PCT Pub. Date: Nov. 12, 2015

(65) Prior Publication Data
US 2017/0146893 A1 May 25, 2017

(51) Int. Cl.
*G03B 17/56* (2006.01)
*F16M 11/12* (2006.01)
*F16M 11/18* (2006.01)

(52) U.S. Cl.
CPC ......... *G03B 17/561* (2013.01); *F16M 11/121* (2013.01); *F16M 11/18* (2013.01); *G03B 17/565* (2013.01); *F16M 2200/021* (2013.01)

(58) Field of Classification Search
CPC .. G03B 17/561; G03B 17/565; F16M 11/121; F16M 11/18

USPC .................................................. 396/419–428
See application file for complete search history.

(56) References Cited

U.S. PATENT DOCUMENTS

| | | | |
|---|---|---|---|
| 4,030,114 A | 6/1977 | Telfer | |
| 2010/0054724 A1 | 3/2010 | Chamberlayne | |
| 2011/0017896 A1 | 1/2011 | Bordignon | |
| 2016/0327847 A1* | 11/2016 | Yang | B64D 47/08 |

FOREIGN PATENT DOCUMENTS

| | | |
|---|---|---|
| CN | 2092655 U | 1/1992 |
| CN | 200947154 Y | 9/2007 |
| CN | 102478147 A | 5/2012 |
| CN | 203857211 U | 10/2014 |
| JP | 2003322904 A | 11/2003 |
| JP | 2013162427 A | 8/2013 |
| WO | 2010108821 A1 | 9/2010 |

OTHER PUBLICATIONS

The World Intellectual Property Organization (WIPO) International Search Report for PCT/CN2014/077200 dated Feb. 17, 2015 p. 1-6.

* cited by examiner

*Primary Examiner* — Christopher Mahoney
(74) *Attorney, Agent, or Firm* — Anova Law Group, PLLC (57) ABSTRACT

A gimbal locking device includes a body portion including a first surface and a second surface opposite to each other, a clutch portion extending from the first surface, and a fastening portion extending from the second surface. The fastening portion includes an extension portion extending from the second surface.

20 Claims, 7 Drawing Sheets

GIMBAL LOCKING DEVICE AND GIMBAL ASSEMBLY USING SAME

CROSS-REFERENCE TO RELATED APPLICATION

This is a national phase application of PCT International Application No. PCT/CN2014/077200, filed on May 9, 2014, the entire contents of which are incorporated herein by reference.

TECHNICAL FIELD

The present disclosure relates to a locking device, and particularly to a gimbal locking device and a gimbal assembly using the same.

BACKGROUND OF THE DISCLOSURE

A gimbal is an apparatus which requires a rotation shaft with high precision. During a process of transporting or holding, the rotation shaft of the gimbal needs to be fixed so as to prevent the gimbal not in operation from rotating. Thus, a bending deformation or damage of each shaft of the gimbal may be avoided.

Currently, a typical fixing manner is to fix by means of multiple parts, which is troublesome in use, and cannot always fix a gimbal at each shaft entirely, such that the gimbal cannot be fixed well.

SUMMARY OF THE DISCLOSURE

The technical problem solved by the present disclosure is to provide a gimbal locking device and a gimbal assembly using the same capable of fixing and protecting an imaging device.

In order to solve the foregoing technical problem, a technical solution employed by the present disclosure is to provide a gimbal locking device for locking an imaging device. The imaging device may comprise a gimbal and an image shooting terminal movably connected with the gimbal. The gimbal may comprise a carrying platform, the carrying platform comprising a base surface and having a first fastening portion extending downward in a direction perpendicular to the base surface, wherein the gimbal locking device may comprise a body portion, a first clutch portion, and a fastening portion extending downward from the body portion, and the body portion may comprise a first surface facing towards the base surface of the carrying platform and a second surface deviated from the first surface, and wherein the first clutch portion may extend from the first surface, and the fastening portion may comprise a first extension portion and a hook portion connected with the first extension portion. The first extension portion may extend vertically from the second surface and the hook portion may be parallel to the second surface. A receiving cavity for receiving the image shooting terminal may be formed between the hook portion, the first extension portion and the second surface. The sum of the thickness of the body portion and the thickness of the first clutch portion may be equal to the distance from the top surface of the image shooting terminal to the base surface of the carrying platform, and the first clutch portion may abut against the first fastening portion.

In some embodiments, the carrying platform may further have a second fastening portion extending downward in a direction perpendicular to the base surface, and the gimbal locking device may further comprise a second clutch portion extending vertically from the first surface. The thickness of the first clutch portion may be equal to that of the second clutch portion, and the position of the second clutch portion may correspond to that of the second fastening portion, and the second clutch portion may abut against the second fastening portion.

In some embodiments, the longitudinal direction of the first clutch portion may be perpendicular to that of the first fastening portion, and the longitudinal direction of the second clutch portion may be substantially parallel to that of the second fastening portion.

In some embodiments, the fastening portion may further comprise a hook portion connected with the first extension portion, the hook portion being substantially parallel to the second surface. A receiving cavity for receiving the image shooting terminal may be formed between the hook portion, the first extension portion and the second surface.

In some embodiments, the length of the first extension portion may be equal to that of the image shooting terminal.

In some embodiments, the first surface may be provided with a notch.

In some embodiments, a sidewall of the body portion may be provided with an opening so as to allow the sidewall to form an abutting portion.

In some embodiments, the gimbal locking device may further comprise a lens cover for covering an optical lens of the image shooting terminal.

In some embodiments, the lens cover may be formed integrally with the locking device.

In some embodiments, the lens cover may comprise a covering portion and two connection portions, one of the connection portions is connected to the second surface of the body portion, and the other one of the connection portions is connected to the hook portion.

In some embodiments, a side of the covering portion may be provided with a first notch.

The embodiments of the disclosure may be implemented by providing a gimbal assembly. The gimbal assembly may comprise an imaging device and a gimbal locking device for locking the imaging device, the imaging device comprising a gimbal and an image shooting terminal movably connected with the gimbal and capable of rotating under a drive of the gimbal, the gimbal comprising a carrying platform, the carrying platform comprising a base surface and having a first fastening portion extending downward in a direction perpendicular to the base surface, wherein the gimbal locking device may comprise a body portion, a first clutch portion, and a fastening portion extending downward from the body portion. The body portion may comprise a first surface facing towards the base surface of the carrying platform and a second surface deviated from the first surface. The first clutch portion may extend from the first surface, and the fastening portion may comprise a first extension portion which extends vertically from the second surface and is used for abutting against the image shooting terminal. The sum of the thickness of the body portion and the thickness of the first clutch portion may be equal to the distance from the top surface of the image shooting terminal to the base surface of the carrying platform, and the first clutch portion may abut against the first fastening portion.

In some embodiments, the carrying platform may further comprise a second fastening portion extending downward in a direction perpendicular to the base surface, and the gimbal locking device may further comprise a second clutch portion extending vertically from the first surface. The thickness of the first clutch portion may be equal to that of the second clutch portion, and the position of the second clutch portion may correspond to that of the second fastening portion, and the second clutch portion may abut against the second fastening portion.

In some embodiments, the carrying platform may comprise a hollow and semicircular extension portion extending downward in a direction perpendicular to the base surface. The first fastening portion may be connected with the extension portion and have a longitudinal direction substantially parallel to the opening direction of the extension portion. The second fastening portion may comprise an inner surface facing towards the extension portion, and the first fastening portion may comprise an outer surface which is far away from the inner surface of the extension portion. The first clutch portion may comprise a first outer side and the second clutch portion may comprise a second outer side, wherein the first outer side may abut against the outer surface of the first fastening portion, and the second outer side may abut against the inner surface of the second fastening portion.

In some embodiments, an operation cavity, which is adjacent to the extension portion and faces towards the opening direction of the extension portion, is provided on the base surface. The gimbal may further comprise a first angle adjusting mechanism, a second angle adjusting mechanism and a third angle adjusting mechanism, wherein the first angle adjusting mechanism may comprise a first rotation arm in a "7" shape and a first mounting casing, one end of the first rotation arm being rotatably connected to the inner of the extension portion and the other end of the first rotation arm being fixedly connected to the first mounting casing, and the first rotation arm being capable of rotating in the operation cavity. In some embodiments, the second angle adjusting mechanism may comprise a second rotation arm in a "7" shape, a second mounting casing and a first motor, wherein one end of the second rotation arm may be rotatably connected with the first mounting casing via the first motor, and the other end of the second rotation arm may be fixedly connected with the second mounting casing. The third angle adjusting mechanism may be a second motor mounted in the second mounting casing, and a rotating shaft of the second motor may be fixedly connected with the image shooting terminal.

In some embodiments, the first rotation arm of the first angle adjusting mechanism may rotate the second angle adjusting mechanism, the third angle adjusting mechanism and the image shooting terminal within the operation cavity along the yaw axis for adjusting the yaw angle of the image shooting terminal. The second angle adjusting mechanism may be connected between the first angle adjusting mechanism and the third angle adjusting mechanism and may rotate the third angle adjusting mechanism and the image shooting terminal around the roll axis of the image shooting terminal for adjusting the roll angle of the image shooting terminal. The third angle adjusting mechanism may rotate around the pitch axis of the image shooting terminal for adjusting the pitch angle of the image shooting terminal.

In some embodiments, the first surface may be provided with a notch at a position corresponding to the extension portion and the first rotation arm.

In some embodiments, a sidewall of the body portion may be provided with an opening so as to allow the sidewall to form an abutting portion for abutting against the inner wall of the first rotation arm. The image shooting terminal may comprise a front side for disposing an optical lens and a rear side deviated from the front side, wherein the distance from the rear side of the image shooting terminal to the first mounting casing of the first angle adjusting mechanism may be equal to the distance from a cavity bottom of the receiving cavity to the outer sidewall of the abutting portion.

In some embodiments, the gimbal locking device may further comprise a lens cover for covering an optical lens of the image shooting terminal.

In some embodiments, the lens cover may be formed integrally with the locking device.

In some embodiments, the lens cover may comprise a covering portion and two connection portions, one of the connection portions being connected to the second surface of the body portion, and the other one of the connection portions being connected to the hook portion.

In some embodiments, a side of the covering portion may be provided with a first notch.

In some embodiments, the length of the first extension portion may be equal to that of the image shooting terminal.

The beneficial effect of the present disclosure is that distinguished from the prior art, the gimbal locking device of the present disclosure can lock the imaging device so as to prevent the imaging device from wobbling.

DETAILED DESCRIPTION OF THE DISCLOSURE

Figure 1:
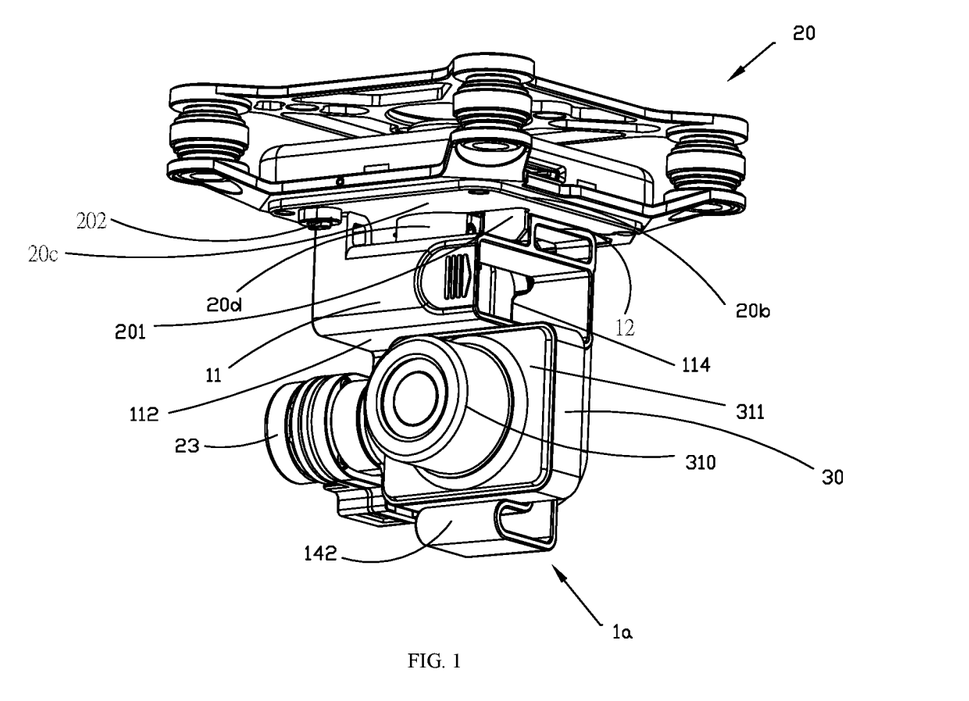
FIG. 1 is a perspective assembly view of a gimbal assembly according to a first embodiment of the present disclosure.
Figure 2:
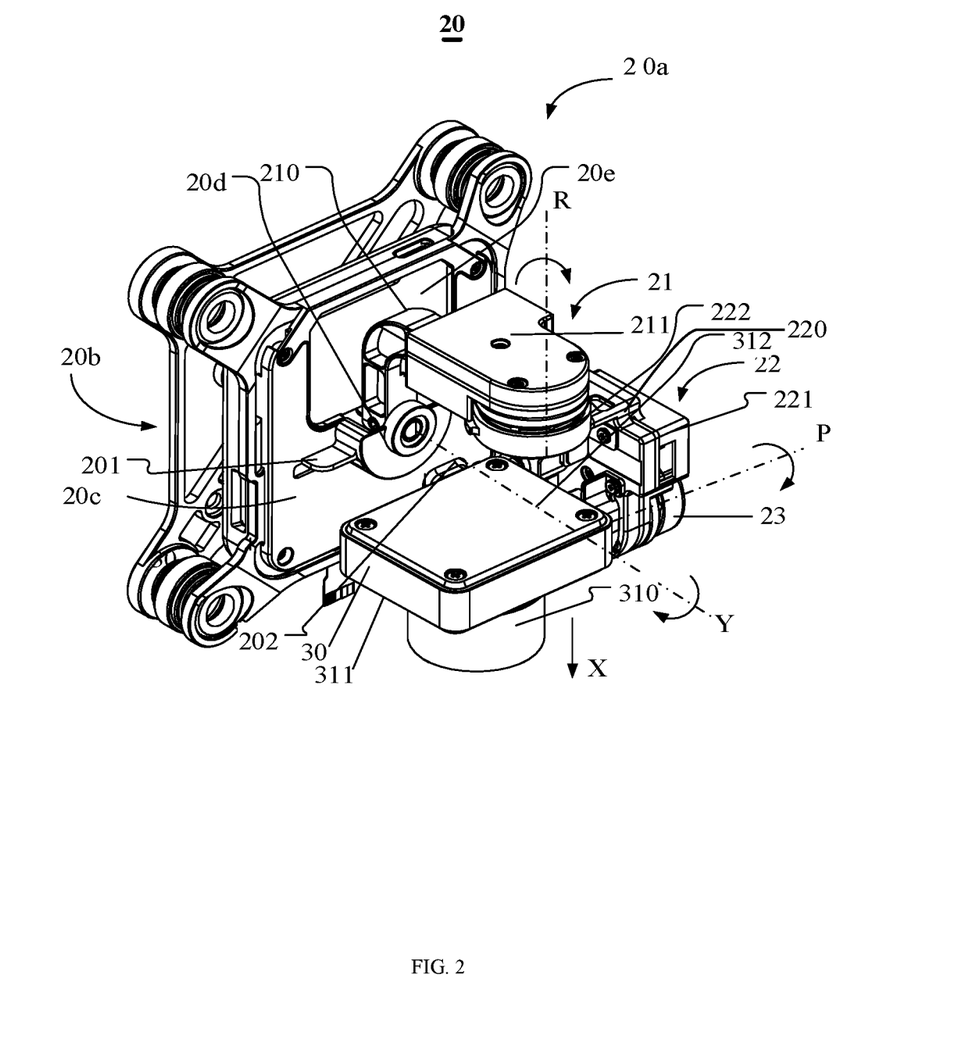
FIG. 2 is a perspective assembly view of an imaging device of FIG. 1.

Referring to FIGS. 1-2, in accordance with the first embodiment of the present disclosure, a gimbal assembly 100 may comprise an imaging device 20 and a gimbal locking device 1a for locking the imaging device 20.

The imaging device 20 may comprise a gimbal 20a and an image shooting terminal 30 which is capable of rotating under the drive of the gimbal 20a.

The gimbal 20a may comprise a carrying platform 20b, a first angle adjusting mechanism 21, a second angle adjusting mechanism 22 and a third angle adjusting mechanism 23.

In some instances, the carrying platform 20b may comprise a base surface 20c. The carrying platform 20b may have a hollow and semicircular extension portion 20d extending downward in a direction perpendicular to the base surface 20c. An operation cavity 20e, which is adjacent to the extension portion 20d and faces towards the opening direction of the extension portion 20d, may be provided on the base surface 20c. The carrying platform 20b may have a first fastening portion 201 and a second fastening portion 202 extending downward in a direction perpendicular to the base surface 20c. The first fastening portion 201 may be connected to the extension portion 20d and the longitudinal direction of the first fastening portion 201 may be substantially parallel to the opening direction of the extension portion 20d. The second fastening portion 202 may be spaced from the first fastening portion 201 by a certain distance, and the longitudinal direction of the second fastening portion 202 may be also substantially parallel to the opening direction of the extension portion 20d. In some embodiments, each one of the extension portion 20d, the first fastening portion 201 and the second fastening portion 202 may be formed integrally with the carrying platform 20b. The second fastening portion 202 may comprise an inner surface which faces towards the extension portion 20d. The first fastening portion 201 may comprise an outer surface which is distant from the inner surface of the extension portion 20d.

The first angle adjusting mechanism 21 may comprise a first rotation arm 210 in a "7" shape and a first mounting casing 211. One end of the first rotation arm 210 may be rotatably connected to the inner of the extension portion 20d and the other end thereof may be fixedly connected to the first mounting casing 211. The first rotation arm 210 may be capable of rotating in the operation cavity 20e.

In some embodiments, the second angle adjusting mechanism 22 may comprise a second rotation arm 220 in a "7" shape, a second mounting casing 221 and a first motor 222. The first motor 222 may comprise a stator assembly mounted in the first mounting casing 211 and a rotor assembly mounted at an end of the second rotation arm 220. Thus, one end of the second rotation arm 220 may be rotatably connected with the first mounting casing 211 via the first motor 222. The other end of the second rotation arm 220 may be fixedly connected with the second mounting casing 221.

The third angle adjusting mechanism 23, which is a second motor, may be mounted in the second mounting casing 221. The rotating shaft of the second motor may be fixedly connected with the image shooting terminal 30.

The image shooting terminal 30 may comprise a front side 311 for disposing an optical lens 310 and a rear side 312 deviated from the front side 311.

The first rotation arm 210 of the first angle adjusting mechanism 21 may rotate the second angle adjusting mechanism 22, the third angle adjusting mechanism 23 and the image shooting terminal 30 within the operation cavity 20e along the yaw axis Y for adjusting the yaw angle of the image shooting terminal 30. In some instances, the second angle adjusting mechanism 22, which is connected between the first angle adjusting mechanism 21 and the third angle adjusting mechanism 23, may be connected to the first angle adjusting mechanism 21 and rotate the third angle adjusting mechanism 23 and the image shooting terminal 30 around the roll axis R of the image shooting terminal 30 for adjusting the roll angle of a payload. The rotating shaft of the third angle adjusting mechanism 23 may be fixedly connected with the image shooting terminal 30 and rotate around the pitch axis P of the image shooting terminal 30 for adjusting the pitch angle of the payload.

In some embodiments, when the roll angle of the payload is adjusted by the second angle adjusting mechanism 22 to vary by 90°, the first angle adjusting mechanism 21 and the third angle adjusting mechanism 23 may roll by 90° synchronously around the roll axis R of the payload, that is, the yaw axis Y and the pitch axis P may reverse by 90° synchronously while maintaining static to each other, which can still maintain the adjusting property of the pitch axis P and the yaw axis Y. Meanwhile, the imaging device 20 can keep stable on a whole since the center of gravity of its entire structure has not been changed, such that the image shooting terminal can take a shooting in any combination of the lateral direction and vertical direction.

Figure 3:
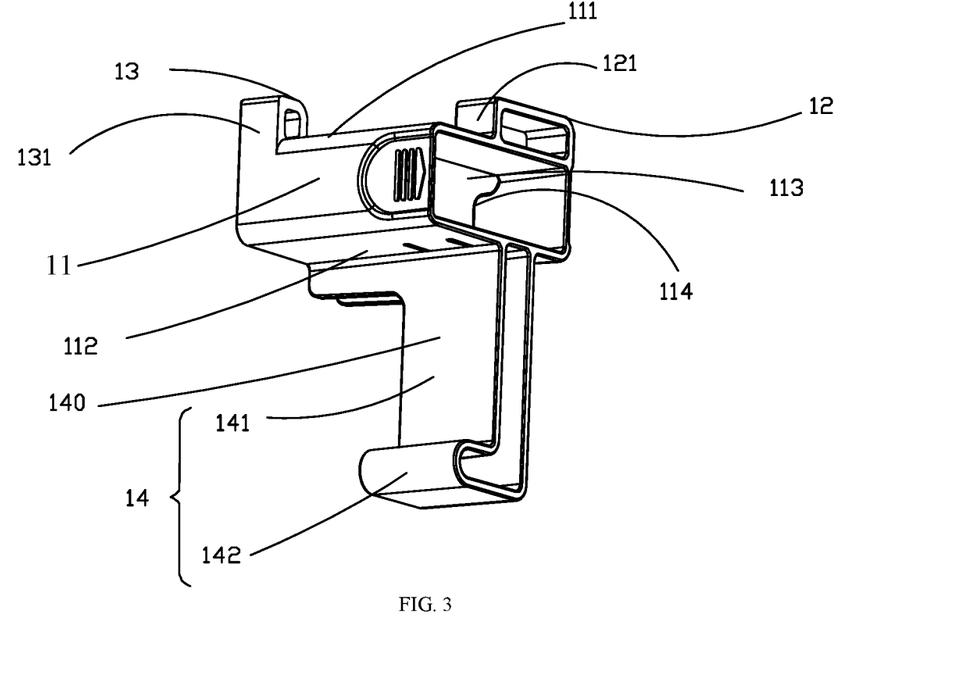
FIG. 3 is a perspective assembly view of a gimbal locking device of FIG. 1.
Figure 4:
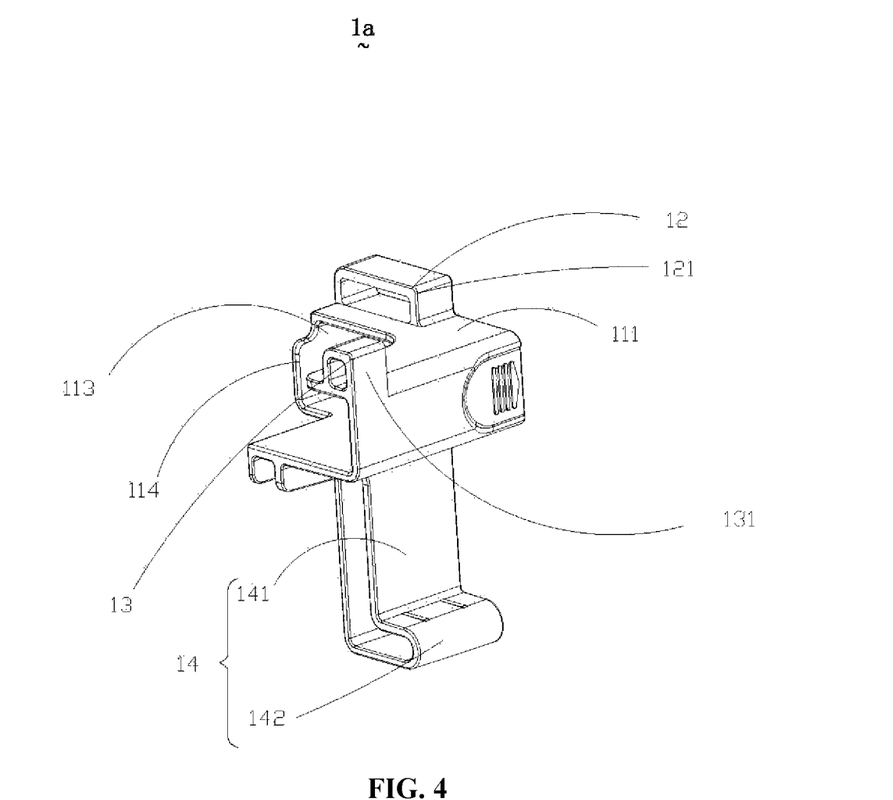
FIG. 4 is a perspective assembly view of the gimbal locking device of FIG. 3 from another angle of view.

Referring to FIGS. 3-4, the gimbal locking device 1a may comprise a body portion 11, a first clutch portion 12, a second clutch portion 13 and a fastening portion 14 extending downward from the body portion 11.

In order to save material and reduce manufacturing cost, in some embodiments, the body portion 11 is a hollow cuboid, which may comprise a first surface 111 facing towards the base surface 20c of the carrying platform 20b and a second surface 112 deviated from the first surface 111. The distance from the first surface 111 to the base surface 20c of the carrying platform 20b is slightly greater than the height of the extension portion 20d. The first surface 111 may be provided with a notch 113 disposed at a position corresponding to the extension portion 20d and the first rotation arm 210. A sidewall of the body portion 11 may be provided with an opening so as to allow the sidewall to form an abutting portion 114 for abutting against the inner wall of the first rotation arm 210.

Each one of the first clutch portion 12 and the second clutch portion 13 may be vertically extended from the first surface 111, the thickness of the first clutch portion 12 is equal to that of the second clutch portion 13. For sake of saving material, each one of the first clutch portion 12 and the second clutch portion 13 may be hollow. The position of the first clutch portion 12 may correspond to the first fastening portion 201. In some embodiments, the longitudinal direction of the first clutch portion 12 may be substantially perpendicular to that of the first fastening portion 201. The first clutch portion 12 may comprise a first outer side 121. The position of the second clutch portion 13 may correspond to that of the second fastening portion 202. In some embodiments, the longitudinal direction of the second clutch portion 13 may be substantially parallel to that of the second fastening portion 202. In some instances, the second clutch portion 13 may comprise a second outer side 131.

The fastening portion 14 may comprise a first extension portion 141 and a hook portion 142 connected with the first extension portion 141. For sake of saving material, the first extension portion 141 may also be hollow correspondingly. The first extension portion 141 may extend substantially vertically from the second surface 112 of the body portion 11. That is, one end of the first extension portion 141 may be fixedly connected to the second surface 112. The hook portion 142 may be vertically connected to the other end of the first extension portion 141, that is, the hook portion 142 can be substantially parallel to the second surface 112 of the body portion 11. In some embodiments, the length of the first extension portion 141 may be equal to that of the image shooting terminal 30. A receiving cavity 140 may be formed between the hook portion 142, the first extension portion 141 and the second surface 112 of the body portion 11.

In use, firstly, the image shooting terminal 30 may be received in the receiving cavity 140, and be fastened between the second surface 112 of the body portion 11 and the hook portion 142; then the first outer side 121 of the first clutch portion 12 may abut against the outer surface of the first fastening portion 201, and the second outer side 131 of the second clutch portion 13 may abut against the inner surface of the second fastening portion 202; finally, the locking device 1a may be pushed along the longitudinal direction of the first clutch portion 12 or the second clutch portion 13 until the abutting portion 114 of the body portion 11 abuts against the inner wall of the first rotation arm 210. In some embodiments, since the sum of the thickness of the body portion 11 and the thickness of the first clutch portion 12 is equal to the distance from the top surface of the image shooting terminal 30 to the base surface 20c of the carrying platform 20b, and the distance from the rear side 312 of the image shooting terminal 30 to the first mounting casing 211 of the first angle adjusting mechanism 21 is equal to the distance from the cavity bottom of the receiving cavity 140 to the outer sidewall of the abutting portion 114, the gimbal locking device 1a can prevent the wobble of the image shooting terminal 30 and the gimbal 20a.

It can be appreciated that, without any limitations to the present embodiment, the second fastening portion 202 and the second clutch portion 13 may be omitted, while the first fastening portion 201 may directly abut against the first clutch portion 12 in some other embodiments.

In some other embodiments, two or more fastening portions may be provided on the base surface 20c of the carrying platform 20b, and two or more clutch portions may be provided correspondingly on the first surface 111 of the locking device 1a, with the fastening portions corresponding to the clutch portions one by one, while not limited to the present embodiment.

In some other embodiments, the locking device 1a may further comprise a lens cover (not shown) for covering the optical lens 310 of the image shooting terminal 30.

Figure 5:
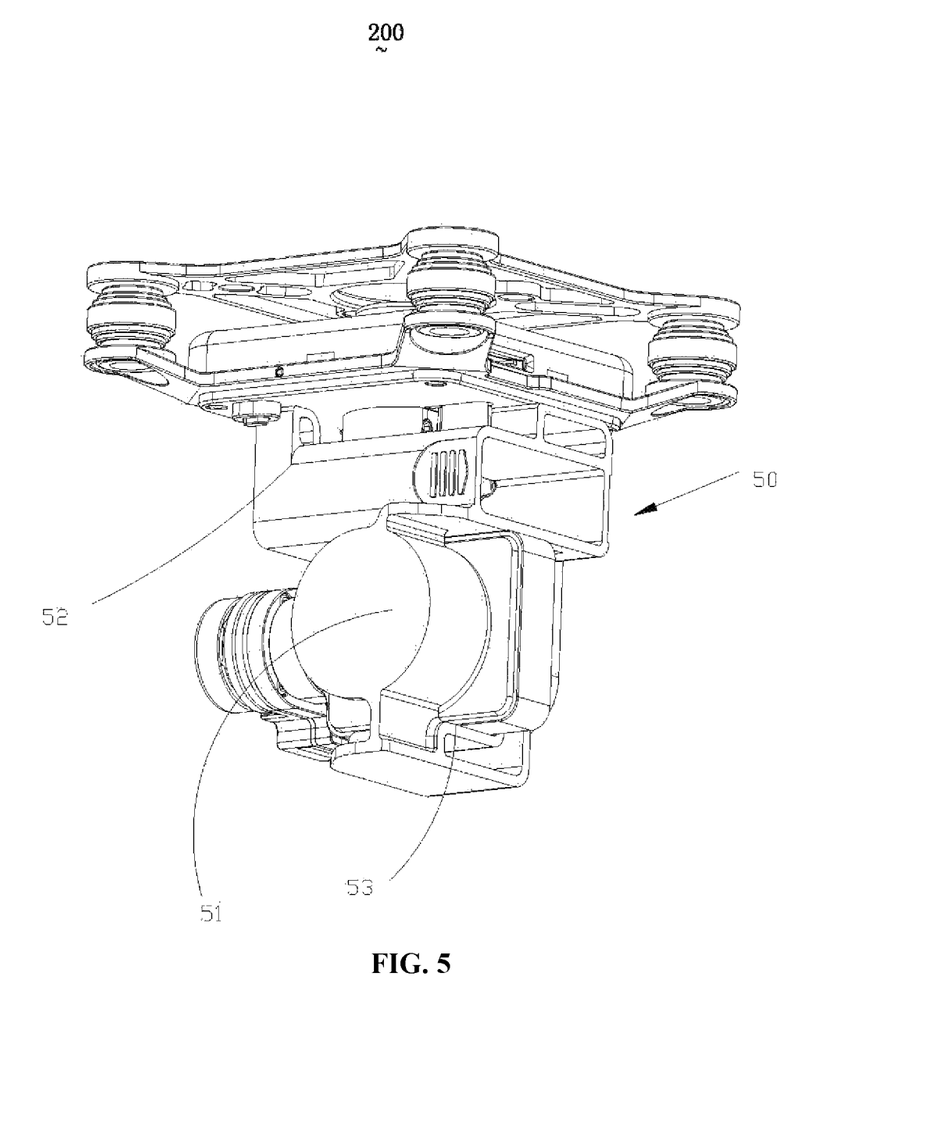
FIG. 5 is a perspective assembly view of a gimbal assembly according to a second embodiment of the present disclosure.
Figure 6:
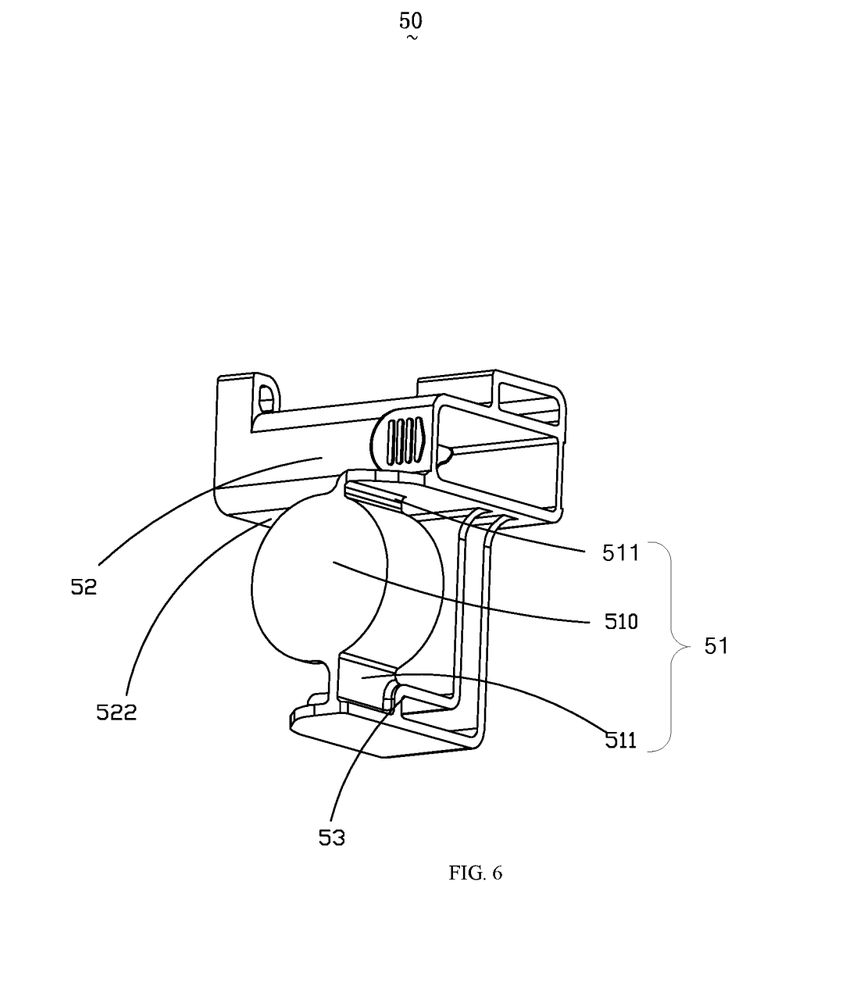
FIG. 6 is a perspective assembly view of a gimbal locking device of FIG. 5.
Figure 7:
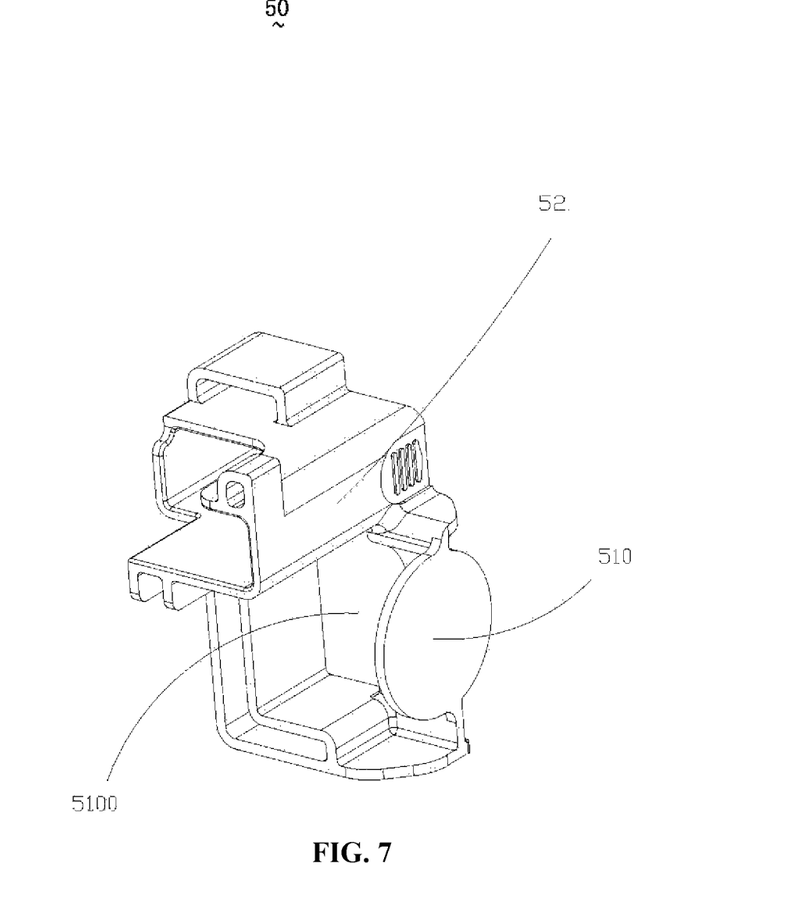
FIG. 7 is a perspective assembly view of the gimbal locking device of FIG. 6 from another angle of view.

Referring to FIGS. 5-7, the second embodiment of the present disclosure may provide a gimbal assembly 200 whose configuration may be substantially the same as that of the gimbal assembly 100 according to the first embodiment of the present disclosure, except for a gimbal locking device 50. In the present embodiment, the lens cover 51 of the gimbal locking device 50 may be formed integrally with the gimbal locking device 50. The lens cover 51 may comprise a covering portion 510 and two connection portions 511, one of the connection portions 511 is connected to the second surface 522 of the body portion 52, and the other one of the connection portions 511 is connected to the hook portion 53. The shape and the size of the covering portion 510 each corresponds to that of the optical lens 310. A first notch 5100, which facilities the sliding of the covering portion 510, is provided on a side of the covering portion 510, so as to allow the optical lens 310 to be entirely received in the covering portion 510, with the image shooting terminal 30 being fastened between the second surface 522 of the body portion 52 and the hook portion 53.

The foregoing disclosure is merely illustrative of the embodiments of the disclosure, and is not intended to limit the patentable scope of the disclosure. Any equivalent structural or flow variations made on the basis of the description and the drawings of the disclosure, and their direct or indirect applications to other relevant technical fields, shall all fall into the patentable scope of the disclosure.

What is claimed is:

1. A gimbal locking device comprising:
a body portion including a first surface and a second surface opposite to each other;
a first clutch portion and a second clutch portion extending from the first surface, a thickness of the second clutch portion equaling a thickness of the first clutch portion, and a position of the second clutch portion being different from a position of the first clutch portion; and
a fastening portion extending from the second surface, the fastening portion including an extension portion extending from the second surface.

2. The gimbal locking device of claim 1, wherein:
the fastening portion further includes a hook portion connected to the extension portion and substantially parallel to the second surface, and
a receiving cavity is formed between the hook portion, the extension portion, and the second surface.

3. The gimbal locking device of claim 2, further comprising a lens cover.

4. The gimbal locking device of claim 3, wherein the lens cover is formed integrally with the gimbal locking device.

5. The gimbal locking device of claim 4, wherein the lens cover includes a covering portion and two connection portions, one of the connection portions being connected to the second surface of the body portion, and another one of the connection portions being connected to the hook portion.

6. The gimbal locking device of claim 4, wherein a side of the covering portion includes a notch.

7. The gimbal locking device of claim 1, wherein the first surface includes a notch.

8. The gimbal locking device of claim 1, wherein a sidewall of the body portion includes an opening so that an abutting portion is formed on the sidewall.

9. A gimbal assembly, comprising:
an imaging device including:
a gimbal including:
a carrying platform including a base surface; and
a first gimbal-side fastening portion and a second gimbal-side fastening portion connected to the base surface and extending in a direction perpendicular to the base surface; and
an image shooting terminal movably connected to the gimbal and configured to rotate under driving of the gimbal;
a gimbal locking device including:
a body portion including:
a first surface facing towards the base surface of the carrying platform; and
a second surface opposite to the first surface;
a first clutch portion and a second clutch portion extending from the first surface; and
a locking-device-side fastening portion extending from the second surface, the locking-device-side fastening portion including a locking-device-side extension portion extending from the second surface and configured to abut against the image shooting terminal,
wherein:
a sum of a thickness of the body portion and a thickness of the clutch portion equals a distance from a top surface of the image shooting terminal to the base surface of the carrying platform,
the first clutch portion abuts against the first gimbal-side fastening portion, and
the second clutch portion abuts against the second gimbal-side fastening portion.

10. The gimbal assembly of claim 9, wherein:
a thickness of the first clutch portion equals a thickness of the second clutch portion, and
a position of the second clutch portion corresponds to a position of the second gimbal-side fastening portion.

11. The gimbal assembly of claim 10, wherein:
the carrying platform includes a gimbal-side extension portion extending in the direction perpendicular to the base surface, the gimbal-side extension portion being hollow and semicircular,
the first gimbal-side fastening portion is connected to the gimbal-side extension portion and has a longitudinal direction substantially parallel to an opening direction of the gimbal-side extension portion, the second gimbal-side fastening portion includes an inner surface facing towards the gimbal-side extension portion, the first gimbal-side fastening portion includes an outer surface facing away from an inner surface of the gimbal-side extension portion, the first clutch portion includes a first outer side abutting against the outer surface of the first gimbal-side fastening portion, and the second clutch portion includes a second outer side abutting against the inner surface of the second gimbal-side fastening portion.

12. The gimbal assembly of claim 11, wherein:

the base surface further includes an operation cavity adjacent to the gimbal-side extension portion and facing towards the opening direction of the gimbal-side extension portion, and the gimbal further includes:
  a first angle adjusting mechanism configured to rotate in the operation cavity and including:
    a first rotation arm in a "7" shape; and
    a first mounting casing,
    wherein one end of the first rotation arm is rotatably connected to an inner of the gimbal-side extension portion, and another end of the first rotation arm is fixedly connected to the first mounting casing;
  a second angle adjusting mechanism including:
    a second rotation arm in a "7" shape;
    a second mounting casing; and
    a first motor,
    wherein one end of the second rotation arm is rotatably connected to the first mounting casing via the first motor, and another end of the second rotation arm is fixedly connected to the second mounting casing; and
  a third angle adjusting mechanism including a second motor mounted in the second mounting casing, a rotating shaft of the second motor being fixedly connected to the image shooting terminal.

13. The gimbal assembly of claim 12, wherein:

the first rotation arm of the first angle adjusting mechanism is configured to rotate the second angle adjusting mechanism, the third angle adjusting mechanism, and the image shooting terminal along a yaw axis of the image shooting terminal for adjusting a yaw angle of the image shooting terminal, the second angle adjusting mechanism is connected between the first angle adjusting mechanism and the third angle adjusting mechanism and is configured to rotate the third angle adjusting mechanism and the image shooting terminal around a roll axis of the image shooting terminal for adjusting a roll angle of the image shooting terminal, and the third angle adjusting mechanism is configured to rotate around a pitch axis of the image shooting terminal for adjusting a pitch angle of the image shooting terminal.

14. The gimbal assembly of claim 12, wherein the first surface includes a notch at a position corresponding to the gimbal-side extension portion and the first rotation arm.

15. The gimbal assembly of claim 12, wherein:

the locking-device-side fastening portion further includes a hook portion connected with the locking-device-side extension portion and being parallel to the second surface, the image shooting terminal is positioned in a receiving cavity formed between the hook portion, the locking-device-side extension portion, and the second surface, a sidewall of the body portion includes an opening so that an abutting portion is formed on the side wall and is configured to abut against an inner wall of the first rotation arm, the image shooting terminal includes a front side configured to dispose an optical lens and a rear side opposite to the front side, and a distance from the rear side of the image shooting terminal to the first mounting casing of the first angle adjusting mechanism equals a distance from a cavity bottom of the receiving cavity to an outer sidewall of the abutting portion.

16. The gimbal assembly of claim 15, wherein the gimbal locking device further includes a lens cover for covering the optical lens.

17. The gimbal assembly of claim 16, wherein the lens cover is formed integrally with the gimbal locking device.

18. The gimbal assembly of claim 17, wherein the lens cover includes a covering portion and two connection portions, one of the connection portions being connected to the second surface of the body portion, and another one of the connection portions being connected to the hook portion.

19. The gimbal assembly of claim 18, wherein a side of the covering portion includes a notch.

20. The gimbal assembly of claim 9, wherein a length of the locking-device-side extension portion equals a length of the image shooting terminal.

* * * * *